No. 855,779. PATENTED JUNE 4, 1907.
P. R. HINKLE.
NUT LOCK.
APPLICATION FILED SEPT. 20, 1906.
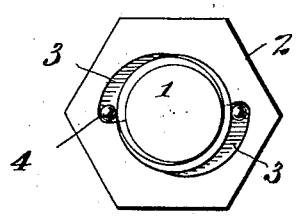
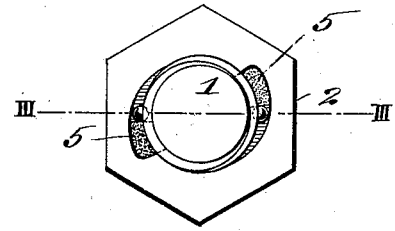
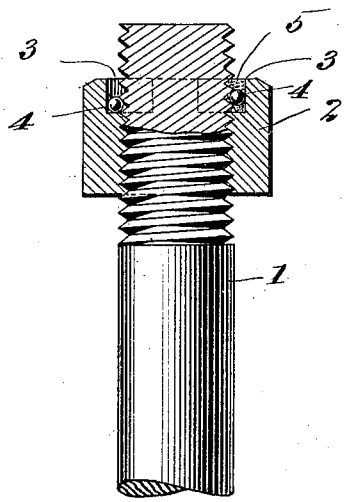
Witnesses
Inventor
Paris R. Hinkle
By his Attorneys

UNITED STATES PATENT OFFICE.

PARIS R. HINKLE, OF MAYER, ARIZONA TERRITORY, ASSIGNOR OF ONE-HALF TO H. A. CLARKE, OF MAYER, ARIZONA TERRITORY.

NUT-LOCK.

No. 855,779.  Specification of Letters Patent.  Patented June 4, 1907.

Application filed September 20, 1906. Serial No. 335,346.

*To all whom it may concern:*

Be it known that I, PARIS R. HINKLE, a citizen of the United States, residing at Mayer, in the county of Yavapai and Arizona Territory, have invented certain new and useful Improvements in Nut-Locks, of which the following is a full, clear, and exact description.

My invention relates to means for locking threaded members against reverse movement relatively to one another, for example, in the use of nut locks, turn buckles, flanges, sleeves, and all similar devices which have a threaded engagement between two parts.

The principal object of the invention is to provide a lock which is operative to prevent any reverse movement of the engaged parts when properly secured, and further to perform this function with unvarying efficiency, regardless of position, vibration, shocks, or other unfavorable influences.

With this and other objects in view, the invention consists in the features of construction hereinafter set forth and claimed.

In the drawings: Figure 1 is a plan view of a nut embodying the principles of my invention in unlocked engagement upon a bolt; Fig. 2 is a similar view showing the parts in locked relation; Fig. 3 is a section on the line III—III of Fig. 2.

The engagement of all threaded parts, in the absence of special locking devices, is a merely frictional one, and for the purposes of construction where the work is exposed to shocks and vibration, an engagement that depends for its permanence upon mere surface friction is unsatisfactory. In order to overcome this defect, various locking means have been proposed, but so far as I am aware they have acted in the way of a stop to limit reverse rotation, rather than a lock to absolutely prevent it. For example, the ordinary ball clutch has been adapted to the purposes of a nut lock, but without special means to insure its immediate action, it is evident that such a clutch does not become effective to lock reverse movement until a certain amount of such movement has taken place. In carrying out the present invention I aim to provide such special means, which used in connection with a form of ball or roller clutch, absolutely prevents reverse movement at its inception.

Referring now to the drawing in which like parts are designated by the same reference sign, 1 indicates a male threaded member, for example, a bolt, and 2 denotes a nut or female threaded member of any sort, to which I have illustrated the features of my invention applied. While the locking devices are shown applied to the female threaded member, it is evident that this is not essential.

In the drawings the nut 2 is shown recessed inward from one of its end faces with eccentric or wedge-shaped cavities 3. The arrangement of having the recesses extend directly inward with a uniform transverse section from the end face of the member is a convenient practical construction, in that it enables the locking devices to be manipulated whenever desired. While I consider it best to have the recesses extend inward from the end face, it is possible to have them made in any way so as to be accessible from some part of the exterior of the member.

4 indicates balls, rollers or rounded pellets of any description, which are respectively contained in the cavities 3. The form and size of these pellets is such as to become wedged inward by the eccentric wall of the cavities 3, so as to bite the threads of the bolt.

For the purpose of locking the pellets 4 in their biting relation against the screw threads I provide certain means, which constitute an important feature of the invention. In Figs. 2 and 3 I have illustrated plugs 5 for this purpose, conveniently of wood, lead or soft material, which are inset in the cavities behind the pellets 4, so as to keep such pellets in their biting relation. The operation is to tighten the nut upon the bolt to the position desired, and thereafter insert the plugs 5 behind the pellets 4. When it becomes necessary to again loosen the nut, the pellets are engaged by some instrument and pressed into the body of the soft plugs so as to become loosened from the threads. Then the nut may be readily unscrewed, as above stated, but unless the locking means is so manipulated, it is evident that no reverse rotation can take place, even under severe shocks and vibration, such as would be incident to use in machinery.

A feature of the invention lies in the relation between the diameter of the pellets and the coarseness of the threads. Inasmuch as the cavities 3 are accessible from the exterior, it is important that the pellets are firmly held against dislodgment when in use. This is secured by having them quite small with respect to the pitch of the threads, as shown in Fig. 3. It will be seen that when the pellets are in operative or locking relation, that the threads form walls or barriers to effectually preclude any longitudinal displacement of the pellet.

What I claim, is:—

1. A means for locking a male and a female threaded member against reverse movement relative to one another, comprising a pellet located in a cavity between the members, and an inelastic plug inset in such cavity and contacting with such pellet.

2. A means for locking a male and a female threaded member against reverse movement relative to one another, comprising a pellet located in a cavity between the members, and a plug of soft inelastic material inset in such cavity and contacting with such pellet.

3. A means for locking a male and a female threaded member against reverse movement relative to one another, comprising a pellet located in a cavity between the members, and accessible from the exterior thereof, and a soft inelastic plug inset in such cavity and contacting with such pellet.

4. In combination with a male threaded member, a female threaded member having a wedge shaped recess accessible from the exterior of said member, a pellet in said recess and a soft metal plug inserted in the recess and in contact with said pellet, as and for the purpose set forth.

5. In combination, a bolt, a nut therefor, said nut having a cavity extending inward from one end wall of the nut, a pellet insertible in said cavity from its open end, and a plug also insertible through said open end and adapted to be pressed into position behind said pellet to lock the pellet in engagement with the bolt threads.

In witness whereof, I subscribe my signature, in the presence of two witnesses.

PARIS R. HINKLE.

Witnesses:
HARRY A. CLARKE,
FRANK W. GIRAUX.